Figure 1:
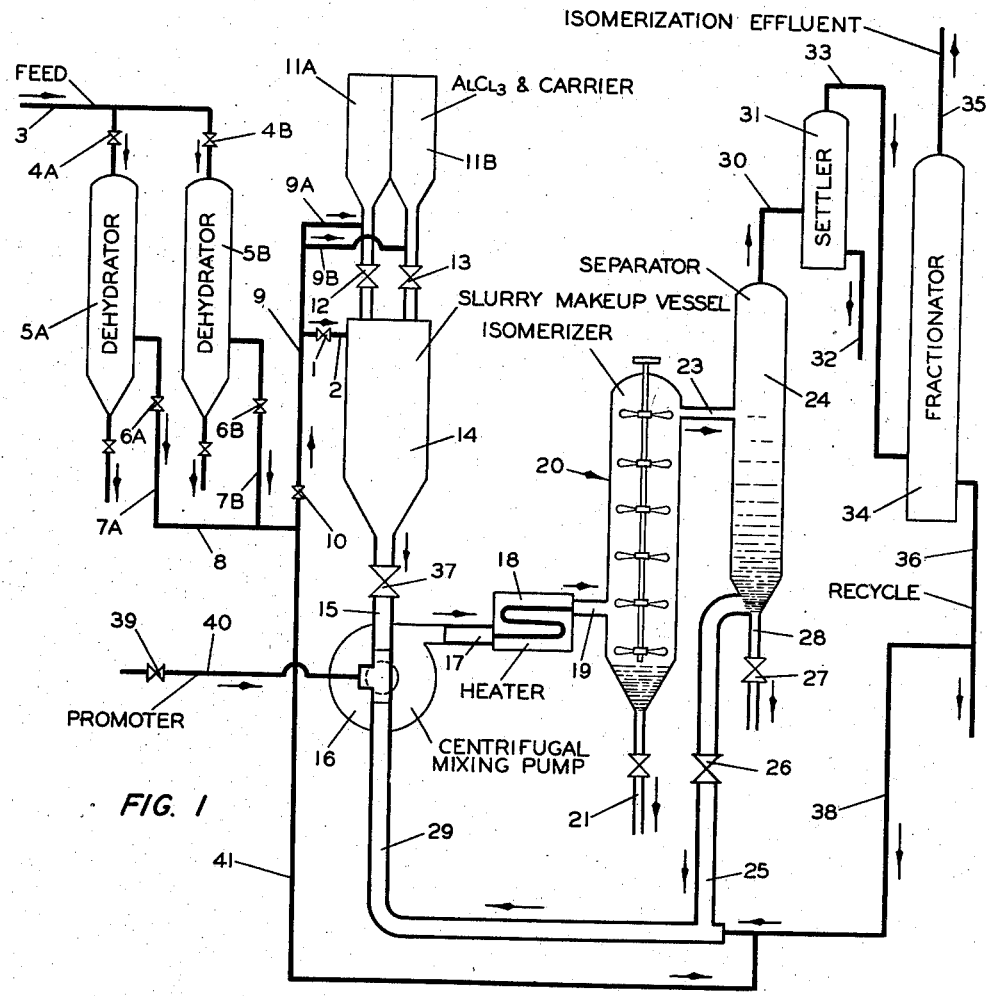

April 24, 1945.  W. A. SCHULZE  2,374,507
HYDROCARBON CONVERSION
Filed May 8, 1942

INVENTOR
WALTER A. SCHULZE
BY Hudson, Young & Yinger
ATTORNEYS

Patented Apr. 24, 1945

2,374,507

UNITED STATES PATENT OFFICE 2,374,507

HYDROCARBON CONVERSION

Walter A. Schulze, Bartlesville, Okla., assignor to Phillips Petroleum Company, a corporation of Delaware Application May 8, 1942, Serial No. 442,269

4 Claims. (Cl. 260—683.5)

This invention relates to the catalytic conversion of hydrocarbons, especially the isomerization of paraffin hydrocarbons, and more specifically to a process for the conversion of paraffin hydrocarbons of normal or substantially straight-chain structure to isoparaffins of branched or more highly branched chain structure. This invention relates also particularly to an improved catalytic arrangement of great efficiency in the promotion of the desired conversion of paraffins to isoparaffins.

Many catalysts have recently been proposed for the catalysis of isomerization reactions of various types, and in the field of paraffin isomerization the use of aluminum halides has been emphasized. In the adaptation of aluminum halides to paraffin isomerization reactions, many physical modifications of the catalyst as well as of operating conditions have been proposed. Typical of such modifications are arrangements of the aluminum halide in a fixed bed, alone or supported upon some type of substantially inert carrier, and passage of the hydrocarbon mixture to be treated through the bed for the conversion under the specified conditions.

Advantage has also been taken of the relatively low temperatures at which the aluminum halides sublime to deposit them upon such carriers. Modifications have been made in some cases in the condition of the carrier as well as in its composition, and much study has been given to the proper type of carriers. In an effort to prolong the catalyst life and activity, additive materials such as hydrogen halide and/or alkyl halides have been employed by injection or addition to the hydrocarbon feed. Still another type of contacting has been provided by the formation of a so-called magma or aluminum halide-hydrocarbon complex, often utilizing special conditions for said formation wherewith to promote the reaction. Although some of these processes have been employed commercially, various problems have arisen in connection with their operation which have interfered greatly with efficient and profitable treatment of the hydrocarbons.

Inefficient contact with the catalyst, with the result that only a fraction of the active material was actually able to promote the reaction before it became covered with mucilaginous reaction products, made it impossible economically to use some of the prior processes. Again, some conditions were devised which were of such severity that large quantities of the catalyst were lost from the reaction chamber and deposited in other and cooler parts of the system, necessitating costly shutdowns. In an effort to combat some of these difficulties, intricate equipment requiring close supervision was devised, with the result that no over-all simplification was achieved. The magmas or complexes were pumped in some cases through the system, but the cost in equipment because of the corrosivity and abrasiveness of the aluminum halides in this form was often prohibitive. Moreover, methods for the control of the activity of the catalyst were imperfect, and the products often were low in yield and/or quality.

The present invention has for an object the provision of a process for isomerizing normal paraffin hydrocarbons to isoparaffin hydrocarbons of more highly branched structure and resultant greater applicability directly to such products as fuels of high antiknock value or indirectly through synthetic methods to the manufacture of various superfuels and other highly specialized products. Another object of the present invention is the provision of an improved catalyst for the promotion of the desired isomerization to supply uniformly high yields of the products sought without excessive losses in the form of highly volatile gases and/or heavy tarry materials. Still another object of this invention is to provide suitable conditions for the operation of the process in order to secure optimum results in the conversion of hydrocarbons or mixtures thereof. Numerous other objects and advantages will become apparent in the subjoined disclosure.

In the operation of the process of this invention, use is made of a very finely divided mixture of the aluminum halide and a selected solid inorganic filler material combined with a portion of the liquid hydrocarbon feed stock to form a slurry which may be pumped in contact with the main hydrocarbon feed stream in a manner analogous to a true liquid treating reagent. The composition of the catalyst can be closely controlled, as can also the relative amounts of catalyst and hydrocarbon liquid feed, thus making it possible to obtain reproducible results with minimum consumption of catalyst and sharply reduced losses of products by side reactions.

Figure 2:
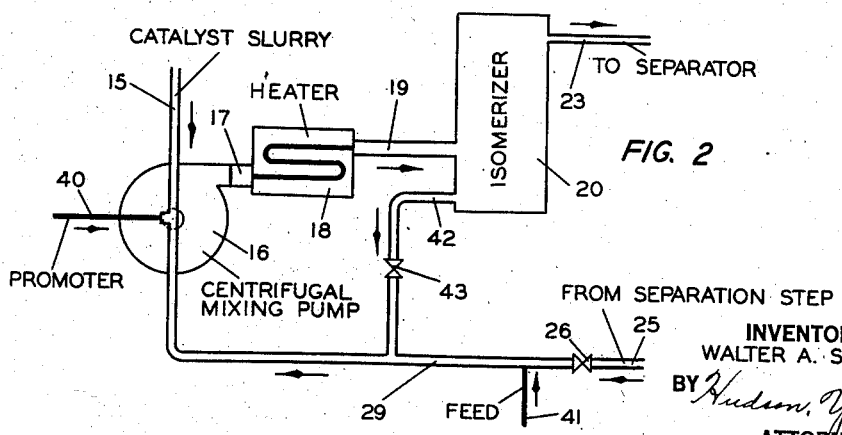

The accompanying diagrams illustrate preferred methods for practicing the process of this invention. Figure 1 is a diagrammatic representation of a complete unit embodying the principles of this disclosure. Figure 2 portrays an alternative method for providing agitation in the reaction chamber. It is to be understood that numerous other methods may be employed in accordance with this invention and those skilled in the art will readily perceive modes of applying the terms of this disclosure to their specific problems. The complete description of the invention, which follows, will be made in connection with Figure 1 in order to achieve greater simplicity in the disclosure. Also, the term "aluminum chloride" will be used hereinafter to symbolize the halides of aluminum, particularly the chloride and bromide, and will be so understood.

In Figure 1, the feed enters by the line 3. This feed stock may be obtained in a number of ways, since this process has broad application to a variety of paraffinic materials. For example, straight run gasoline distilled from crude petroleum, natural gasoline, acid-treated oils, specific fractions of the above, comparatively pure hydrocarbons such as normal butane, normal pentane, normal hexane, and the like may be employed as a starting material in this process. Moving along line 3, the feed stock enters, by the valve 4A, the dehydrating zone 5A. The zone 5A contains any suitable dehydrating material, such as dehydrated alumina, silica gel, drierite, calcium chloride and the like, and is operated to render the hydrocarbon feed substantially dry. This precaution preserves the life of the catalyst and leads to improved operation throughout the unit. In some cases, of course, the history of the manufacture of the feed stock precludes the presence of moisture, and for such conditions, the dehydration step may be omitted, but it should be reasonably certain that no moisture is present. Although a small amount of moisture may not be harmful, and may even be of some benefit in special instances, the manner of controlling this moisture to yield positive benefit in every case is not very well correlated, and it is therefore considered better practice to avoid it altogether.

The dehydrated feed passes out of the dehydrating zone through valve 6A and line 7A to line 8. When the desiccant in the zone 5A is no longer able to provide the desired degree of dehydration, the valves 4A and 6A are closed and the valves 4B and 6B are opened, allowing the feed to flow through the dehydrating zone 5B, which is identical with 5A. During this period, the drying agent in 5A is regenerated by known methods, and thus prepared for additional service when unit 5B requires regeneration. In this manner, continuous operation is obtained in the dehydration of the charge stock.

A regulated portion of the charge is removed from line 8 by line 9 through control valve 10, which maintains the desired flow of the stock in line 9. Controlled amounts of very finely divided aluminum chloride and the porous carrier or filler material are added to the makeup vessel 14 from the bins 11A and 11B through the valves 12 and 13 which may be rotary barrel valves of known type, so that a slurry may be made up with the feed stock entering from line 9. To assist in carrying the solid material out of the vessels 11A and 11B, the hydrocarbon feed stream 9 may be divided into the streams 9A and 9B, which may be passed through a jet arrangement into the lower portions of the delivery lines associated with valves 12 and 13. In this manner, the solids may be drawn into the liquid stream at a more easily controlled and uniform rate. If desired, additional liquid may be added directly to the vessel 14 by line 2, which is controlled by the valve 1. The solid particles employed in this slurry ordinarily pass a 100-mesh sieve, but in special types of feed stocks somewhat larger sizes may be used satisfactorily. The slurry prepared in vessel 14 is ordinarily made up using a minimum of the hydrocarbon liquid in order to reduce any conversion which may tend to take place as a result of the extended contact with fresh catalyst which is sometimes necessary when the new reagent slurry is made up in large batches at intervals. Depending upon the feed stock, this may range as high as 95 per cent or more of solids in the concentrated slurry. However, this procedure is by no means the only method available for making up the slurry, since it may be desired to use any other proportions ranging to those corresponding to the passage of the entire feed stream through the slurry-forming chamber. This would be a more exacting procedure in terms of control, because it would be necessary to add two solid reagent streams at a regulated rate to the liquid feed. Nevertheless, it is possible to operate in any manner between the extremes noted, and various methods may be employed, as desired for differing requirements in specific installations. The carrier may comprise from about 25 to about 75 per cent of the added solids in the slurry, as prepared for addition to the main stream of feed stock. The proportions may vary somewhat with the purpose of the treatment and the nature of the feed stock. The manner of making up a slurry as here disclosed is productive of catalyst of great adaptability and one which is susceptible to complete control throughout its period of use. Since the composition of the catalyst is controlled, and it can be supplied to the feed in any desired amount, it is evident that the catalyst is very efficiently prepared and used.

The solid inorganic filler employed with the aluminum chloride contributes importantly to the pumping characteristics of the slurry and is particularly valuable in reducing the lumping and sludging tendencies and the abrasion which are usually experienced in handling aluminum chloride catalysts. As the filler component, I prefer to use natural materials such as brucite, periclase, magnesite, talc, asbestos and the like, or the synthetic counterparts of some of them. Other materials which provide the proper pumping and dispersion characteristics in the slurry may be used if desired; for example, bentonite, diatomaceous earth, fuller's earth, and the like. It is not to be understood from the foregoing, however, that the various materials mentioned are interchangeable in their effects, but rather must be considered in connection with the feed stock and the proposed operating conditions. The filler material is usually first treated by heating to high temperature to substantially remove both adsorbed water and water of constitution. The calcined material is then crushed and screened to size, except in the case of fibrous asbestos which may be used after selection of suitable fibre length. These materials blend into the slurry very satisfactorily and are readily kept in suspension with a minimum of agitation, but drop out of suspension quite well when allowed to remain quiescent. The slurry catalyst thus formulated is very effective in promoting the desired conversions.

The prepared slurry from vessel 14 is added by line 15 through valve 37 to the circulating pump 16, as makeup for spent or sludged catalyst. The makeup can obviously be added either continuously or intermittently, as required. The rate of addition of fresh catalyst may be determined by the rate of withdrawal of spent catalyst and/or the degree of conversion indicated by the products of the process. The concentration of active catalytic substance is thus maintained at the desired level under this invention. The major proportion of the slurry enters the pump 16 from the line 29, returning from the treatment of some previously converted feed stock.

The pump 16 is ordinarily of the centrifugal or similar type giving agitation to the entering streams so that thorough mixing is obtained, and the effluent from the pump is a uniform slurry of lower viscosity and solids content than the two entering slurry streams from lines 15 and 29. The feed stock is usually mixed with slurry so that the total mixture contains from about one to about 15 per cent or more of aluminum chloride, but it is preferred to employ aluminum chloride concentrations in the range of about three to about eight weight per cent for most conversions by this method. The selection of the proper concentration of aluminum chloride to be used depends upon the type of feed stock, the prescribed operating conditions, and other factors pertinent to a particular case.

In some cases it may be desirable to add catalyst promoters such as hydrogen halides and/or various alkyl halides. Such addition may be made by means of control valve 39 and line 40 to the pump unit 16. The promoters may be recovered following the reaction zone in a manner described below.

The streams entering the pump 16 are thoroughly blended together by the agitation of said pump and the newly-formed slurry passes by line 17 to the heating zone 18. Since the flow characteristics of the slurry are very close to those of a true liquid, the particular type of heating employed is of little importance so long as the means used has adequate capacity for the heating requirements of the treatment. In many cases, simple heat exchange with any available hot streams may be satisfactory, since the temperatures at which this reaction is carried out are quite moderate for the most part. However, if it is desired to employ any of various types of stills and the like, the flexibility of the slurry permits such applications. Under this invention, the conversion of the hydrocarbon may be effected in the temperature range of about 150 to about 750° F., with about 150 to about 400° F. being preferred. At the higher temperatures it is desirable to apply sufficient pressure to maintain the slurry as much as possible in liquid phase; where the critical temperature of the hydrocarbon is exceeded, this is of course impossible, but it is good practice to maintain the aluminum chloride as a solid, and no temperatures will be considered which will approach transition conditions for the filler material. The isomerization reaction with this catalyst may be effected at any convenient pressure above that which is required for maintenance of the liquid phase as above described, and, accordingly, pressures up to 1000 pounds per square inch and even higher are sometimes employed. This condition can often be determined by that required by closely associated treating or refining operations.

After passing through the zone 18, the heated slurry flows by line 19 to the reaction chamber 20, which is well insulated in order to maintain the temperature of the reaction mixture, and may be supplied with auxiliary heating means if desired. The chamber 20 is ordinarily equipped with an agitating or mixing mechanism so as to assist in maintaining the desired intimacy of contact between the aluminum chloride and the feed stock. This also provides uniform treatment so that substantially no portion of the feed is overtreated, nor another portion virtually unconverted, so that side reactions which might ordinarily be initiated have little opportunity to commence. The rate of flow through the reaction chamber is adjusted to provide the desired length of contact, which may vary from ½ to 24 hours in accordance with the objective of the treatment and the mildness or severity of the conditions applied. The reaction mixture is thus maintained and agitated under the reaction conditions for a suitable period.

By judicious application of the fresh slurry in the unit 16, the activity of the catalyst may be maintained at the desired level which contributes to the uniformity of the results obtained, since localized zones of great activity have often reduced the quantity and quality of the products in prior processes. Completely spent particles of the catalyst may tend to agglomerate and form larger sticky aggregates which no longer remain in suspension. These materials gradually drop out of the slurry into the bottom of the reaction chamber and may be withdrawn as desired by line 21. It is a particular feature of the present invention that the finely divided solid filler material employed with the aluminum chloride largely prevents such agglomeration of catalyst before it is substantially spent.

After the specified reaction time, the slurry flows from the reaction chamber 20 by line 23 to the zone 24, which is employed to separate the solid portions of the slurry from the treated hydrocarbons. This chamber is ordinarily uninsulated so that the mixture may cool as rapidly as possible, whereby separation and settling are promoted. If desired, cooling means may be integrated with the chamber 24 to assist in reducing the temperature of the reacted materials. As in the chamber 20, the most nearly spent catalyst tends to coalesce and settles more rapidly, collecting at the bottom of the separating zone, whence it may be withdrawn as desired by valve 27 and line 28. The slurry for recirculation is removed at a somewhat higher level by line 25 and valve 26, which controls the rate of flow. The chamber 24 is ordinarily large enough to assure its quiescence in spite of the entering mixture at line 23 and the effluent stream at line 25.

Another method which may be used for the separation of the slurry into clear liquid and denser slurry is the employment of a number of smaller units corresponding to chamber 24, which are operated batchwise. By this method, the chamber is filled and allowed to stand for a sufficient period to permit the desired amount of clarification of the hydrocarbon. This may then be displaced by additional portions of the reacted mixture. Periodically, the spent material may be withdrawn from the bottom, and slurry for recirculation may be removed as required. Where the single unit 24 is used, the hydrocarbon is substantially clear when it reaches the top of the chamber, and overflows by line 30. Fresh feed from line 8 passes into line 41 which carries the liquid hydrocarbon to a point below the valve 26, as indicated, and is there forced into the line 29 in such a manner that an injector effect is exerted upon the dense slurry in the line, thus assisting in maintaining the flow of recirculation catalyst from the bottom of the zone 24, through the line 25 and the valve 26. The slurry then passes by line 29 to the pump 16, wherein fresh slurry entering by line 15 is added to make up the desired initial strength of the catalyst.

The treated and clarified hydrocarbon passes by line 30 to unit 31, which is used to remove any heavy materials including slurry solids which may have been carried over from chamber 24. These materials leave via line 32. The remainder of the stream may be vaporized and passes over by line 33 to the fractionating zone 34, in which the desired separations of the product are made. Where, for example, butane is being converted to isobutane, the contents of the bottoms line 36 will consist largely of unconverted normal butane, which may be recirculated to the line 41 by the alternate line 38. If desired, this recirculated stream may be returned to the dehydration treatment, but this is not ordinarily necessary. The overhead stream 35 from unit 34 may require additional fractionation to segregate isobutane from a small amount of lighter hydrocarbons resulting from the process.

In the case of a hydrocarbon mixture such as a straight run gasoline and the like, the stream 36 would comprise the finished product and pass to storage, and the stream 35 would contain the materials undesirable in the motor fuel fraction, by reason of excessive volatility, or in short, the unit 34 would be operated as a conventional gasoline stabilizer. In similar fashion, the fractionating zone may be fitted to the isomerization of any chosen type of charge stock in order to segregate the desired portions of the reaction products.

Regardless of the type of feed stock, the overhead stream 35, containing the most volatile portions of the products, will ordinarily carry the halide catalyst promoters, if any have been added. After due treatment for the concentration of the promoter, it may be returned to line 40 for recirculation or to the source of supply of the promoter. Often simple fractionation suffices for adequate concentration; it is not ordinarily necessary to remove all the hydrocarbons which may be associated with the concentrated promoter, since those left do not usually prejudice the operation of the process.

Figure 2 illustrates a portion of the equipment utilizing an arrangement designed to provide agitation for the reaction mixture in the reactor 20. The mixture containing fresh hydrocarbon feed, finely divided catalyst and promoter, if desired, is forced by the pump 16 by line 17 to the heating zone 18. The heated slurry then passes by line 19 to reactor 20, which is designed to provide the desired time of contact between the hydrocarbons and the catalyst. By means of the line 42 and the control valve 43, connection is made between the line 29 on the intake side of pump 16, and the reaction zone 20. The valve 43 may be operated in any desired manner that provides sufficient movement of the reaction mixture to serve as the agitation of the mixture which is of great importance in securing uniform operation. Fresh feed enters at line 41 and operates as in Figure 1 to inject the heavy slurry from the separation zone by line 25 and control valve 26. It will now be seen that the use of the pump in this manner serves a double purpose in providing agitation; the contents of the vessel 20 are churned about in the vessel itself, and the material which is returned to the pump is subjected to the vigorous stirring action of that equipment. The treated product containing suspended catalyst is removed by the line 23, as previously described, and the remainder of the treatment may be according to methods analogous to those indicated in Figure 1.

The operations outlined above permit exceptional flexibility and economy from the standpoint of catalyst utilization. As noted previously, additions of fresh catalyst are limited to amounts required to maintain a desirable degree of activity and of isomerization according to reaction conditions. In this manner, the total amount of catalyst within the system at any time is only a minor proportion of the volume of hydrocarbon liquid therein. This treating ratio is made possible by the thorough dispersion of the catalyst in the hydrocarbon liquid and the intimate contact obtained thereby. In contrast, when hydrocarbon liquids or vapors are treated by percolation through fixed catalyst beds, the volume of catalyst is usually a rather large fraction of the hourly liquid volume throughput of a treating unit in order that adequate contact or reaction time be obtained. The present process thus provides for satisfactory conversion with a minimum consumption of catalyst, since the conditions insure substantially complete utilization of the relatively small volumes of catalyst employed.

As carrier, I may use any finely divided solid inorganic material adapted to serve the purpose and remain in suspension or slurry form for a suitable length of time. Preferably the carrier is porous even when finely divided so that it will adsorb the aluminum chloride and extend the surface thereof. Examples of suitable carrier materials are: brucite, magnesite, magnesia, periclase, alumina, bauxite, clay, bentonite, asbestos, especially short fiber asbestos, talc, fuller's earth, diatomaceous earth, etc. The carrier may desirably be ground to a fineness of at least 100 mesh. As mentioned above it should be anhydrous.

If desired instead of using a simple mixture of the carrier and the aluminum chloride, ground separately and admixed or admixed and ground together, in accordance with the invention I may alternatively impregnate the coarse or fine carrier with vaporized aluminum chloride which condenses thereon and within the pores thereof, followed by grinding if desired or necessary. The impregnation may be done by subliming the aluminum chloride or by heating a mixture of the carrier and powdered aluminum chloride to cause the latter to volatize and impregnate the carrier. The fine mixture of aluminum chloride and carrier prepared in the foregoing manner, and especially that prepared by impregnating the coarse carrier with the aluminum chloride followed by grinding to the requisite fineness, is used in the same manner as that described above.

Spent catalyst from the process may be accumulated, if desired, and treated to recover the inorganic filler material. Thus, by hydrolysis of acidic components and removal of organic matter, the brucite, magnesia or similar material may be recovered, calcined to the proper degree, and re-used in the preparation of the new aluminum halide catalyst.

Operations characteristic of this invention are discussed in detail below. These examples, it is to be understood, are given only as samples of specific operations carried out under this invention, and are therefore by no means a compilation of all possible treatments within the scope of this process.

*Example I*

A $C_4$ fraction is being treated to form isobutane by the use of an aluminum chloride slurry catalyst. The feed stock contains five mol per cent isobutane and the remainder is normal butane. The fraction is passed into the unit at the rate of five gallons per hour and is treated at 50° F. and 150 pounds per square inch. The catalyst, in the form of aluminum chloride and dehydrated brucite passing a 200-mesh screen and in the weight ratio of 1:1, is suspended with a small portion of the feed and supplied at the rate of 2.5 pounds of the fresh solid mixture in a total catalyst circulation of about 10 pounds per hour. The product contains 58 per cent isobutane and about 40 per cent normal butane, which is separated and recirculated to the catalyst. The ultimate conversion of normal butane with this catalyst was found to be 95.7 per cent.

*Example II*

A normal pentane fraction containing 13 per cent isopentane and 87 per cent n-pentane was treated with a slurry catalyst containing aluminum chloride and short fiber asbestos in the weight ratio of 3:1. The conversion was carried out at 350° F., 200 pounds per square inch, and the feed was pumped in at the rate of 10 gallons per hour. The rate of fresh catalyst supply was maintained at 2.7 pounds per hour, while the total catalyst circulated was about 12 pounds per hour. After fractionation of the products, there was obtained 4.4 gallons of isopentane per hour, five gallons of recirculatable $C_5$ hydrocarbon and the remainder was in the form of both lighter and heavier materials. It was estimated that the ultimate conversion to isopentane would exceed 85 per cent.

*Example III*

A normal hexane fraction having an initial octane number of 45 was treated with an aluminum chloride slurry catalyst containing synthetic magnesia as the filler material. The solids had been ground and screened to pass a 100-mesh screen, and were mixed three parts of aluminum chloride to two parts of magnesia. The gasoline entered the treating zone at the rate of five gallons per hour, and the slurry was replaced at the rate of three pounds per hour. Treating at 350° F. and 150 pounds per square inch, a yield of isomeric hexanes amounting to 90.5 per cent of the charge was obtained, with an octane number of 60. In the other products, three per cent based on the charge was isobutane, out of 5.5 per cent of lighter materials formed. The remainder was composed of hydrocarbons boiling higher than the gasoline boiling range.

A number of examples have been given showing a number of distinct applications of this invention to various types of feed stocks and employing a variety of conditions and catalytic combinations. It will be clear that there are a large number of other modifications whereby this invention may be applied, and it is intended that such operations may be carried out within the scope of the present disclosure. The foregoing discussions and examples have served to explain the manner of applying my invention to many types of treatments, and the full scope thereof is expressed in the attached claims. While the above description relates primarily to isomerization, the principles of the invention are applicable in alkylation of paraffin hydrocarbons, isomerization of olefin hydrocarbons, etc.

I claim:

1. A process for the isomerization of paraffinic hydrocarbons of at least 4 carbon atoms per molecule by means of a catalyst comprising an aluminum halide, which comprises passing a liquid saturated hydrocarbon material comprising such hydrocarbons into a vertical reaction zone at an intermediate point thereof together with a catalyst comprising a finely divided mixture of an aluminum halide active for isomerization and an inorganic solid filler material, said aluminum halide and said filler material being in such fine particles as to be able to pass a 100-mesh sieve and being suspended in said hydrocarbons, maintaining said hydrocarbons and said catalyst in said reaction zone at temperatures in the range of about 150 to about 700° F. and pressures in the range of about atmospheric to about 1000 pounds per square inch for a time sufficient to effect substantial isomerization, agitating the contents of said reaction zone so as to maintain substantially all of the active catalyst in suspension in said hydrocarbons but to allow aggregates of coalesced substantially spent catalyst particles to settle to the bottom thereof, withdrawing the so-settled spent catalyst from the bottom of said reaction zone and from the system, passing hydrocarbons and suspended catalyst from a point in said reaction zone above the point of introduction thereof to a quiescent separating zone, withdrawing from the bottom of said quiescent zone settled substantially spent catalyst and removing same from the system, withdrawing from a low point in said quiescent zone but above the bottom thereof a suspension of active catalyst in hydrocarbons and returning same to said reaction zone together with fresh catalyst and hydrocarbon feed to be isomerized, and withdrawing from a high point in said quiescent zone hydrocarbons comprising the isomerized product substantially free of catalyst particles.

2. The process of claim 1 in which said aluminum halide is aluminum chloride, and is activated with hydrogen chloride.

3. The process of claim 1 in which normal butane is isomerized to isobutane.

4. A process for the isomerization of paraffinic hydrocarbons of at least 4 carbon atoms per molecule by means of a catalyst comprising an aluminum halide, which comprises passing said hydrocarbons into a vertical reaction zone at an intermediate point thereof together with a catalyst comprising a finely divided mixture of an aluminum halide active for isomerization and an inorganic solid filler material, said aluminum halide and said filler material being in such fine particles as to be able to pass a 100-mesh sieve and being suspended in said hydrocarbons, maintaining said hydrocarbons and said catalyst in said reaction zone at isomerization conditions of temperature and pressure for a time sufficient to effect the desired isomerization, agitating the contents of said reaction zone so as to maintain substantially all of the active catalyst in suspension in said hydrocarbon but to allow aggregates of coalesced substantially spent catalyst particles to settle to the bottom thereof, withdrawing the so-settled spent catalyst from the bottom of said reaction zone and from the system, passing hydrocarbons and suspended catalyst from a point in said reaction zone above the point of introduction thereof to a quiescent separating zone, withdrawing from a low point thereof a suspension of active catalyst in hydrocarbons, admixing therewith fresh catalyst and hydrocarbon feed to be isomerized and passing same to the inlet of said reaction zone, and withdrawing from a high point in said quiescent zone hydrocarbons comprising the isomerized product substantially free of catalyst particles.

WALTER A. SCHULZE.